(12) United States Patent
Johnson et al.

(10) Patent No.: US 9,470,226 B2
(45) Date of Patent: Oct. 18, 2016

(54) MULTI-PART VALVE ASSEMBLY

(71) Applicant: ValveWorks, LLC, Dallas, TX (US)

(72) Inventors: Daniel E. Johnson, Double Oak, TX (US); Edward P. Cox, Sugar Land, TX (US); Starr L. Pitzer, Jr., Dallas, TX (US)

(73) Assignee: ValveWorks, LLC, Dallas, TX (US)

( * ) Notice: Subject to any disclaimer, the term of this patent is extended or adjusted under 35 U.S.C. 154(b) by 0 days.

(21) Appl. No.: 14/213,696

(22) Filed: Mar. 14, 2014

(65) Prior Publication Data

US 2014/0264133 A1 Sep. 18, 2014

Related U.S. Application Data

(60) Provisional application No. 61/785,246, filed on Mar. 14, 2013.

(51) Int. Cl.
*F04B 53/10* (2006.01)

(52) U.S. Cl.
CPC ................. *F04B 53/1027* (2013.01)

(58) Field of Classification Search
CPC .............. F16K 1/34; F16K 1/36; F16K 1/38; F16K 15/06; F16K 15/023; F16K 15/028; F16K 51/00; F04B 53/1027
USPC .......................... 251/332, 356, 367; 137/902
See application file for complete search history.

(56) References Cited

U.S. PATENT DOCUMENTS

| | | | |
|---|---|---|---|
| 1,721,114 A * | 7/1929 | Hampton et al. | 137/516.29 |
| 1,861,420 A * | 5/1932 | Mahan | F04B 53/1027 137/516.29 |
| 2,093,662 A | 9/1937 | Steirly | |
| 2,483,572 A | 10/1949 | Cater | |
| 2,745,631 A | 5/1956 | Shellman | |
| 2,792,016 A | 5/1957 | Shellman et al. | |
| 2,898,082 A | 8/1959 | Von Almen et al. | |
| 2,903,235 A | 9/1959 | Rodgers et al. | |
| 3,057,372 A | 10/1962 | Sutton et al. | |
| 3,063,467 A | 11/1962 | Roberts, Jr. et al. | |
| 3,070,120 A | 12/1962 | Wendt | |
| 3,092,139 A | 6/1963 | Rodgers et al. | |
| 3,202,178 A | 8/1965 | Wolfe | |
| 3,324,880 A | 6/1967 | Roberts et al. | |
| 3,409,039 A | 11/1968 | Griffin | |
| 3,483,885 A | 12/1969 | Leathers | |
| 4,076,212 A | 2/1978 | Leman | |
| 4,180,097 A | 12/1979 | Sjoberg | |
| 4,518,329 A * | 5/1985 | Weaver | 417/566 |
| 4,545,404 A | 10/1985 | Redwine | |
| 4,860,995 A | 8/1989 | Rogers | |

(Continued)

FOREIGN PATENT DOCUMENTS

EP 0 823 577 A2 2/1998

*Primary Examiner* — Marina Tietjen
(74) *Attorney, Agent, or Firm* — John G. Fischer, Esq.; Scheef & Stone, L.L.P.

(57) ABSTRACT

The present invention discloses a multi-component valve system for use in pumps such as fracking pumps for use in subterranean resource production. The assembly includes a retaining pin, a guide on the retaining pin, a valve on the retaining pin, an insert on the retaining pin, a retainer above the insert on the retaining pin, and a retainer cap inertia welded to the end of the retaining pin. In a particular embodiment, the guide component is stamped and folded to create the desired shape.

10 Claims, 8 Drawing Sheets

(56) References Cited

U.S. PATENT DOCUMENTS

| | | | |
|---|---|---|---|
| 5,030,413 A * | 7/1991 | Knierriem | G21C 5/06 376/364 |
| 5,088,521 A | 2/1992 | Johnson | |
| 5,193,577 A | 3/1993 | de Koning | |
| 5,275,204 A | 1/1994 | Rogers et al. | |
| 5,687,792 A | 11/1997 | Rodger et al. | |
| 6,808,157 B1 | 10/2004 | Mudge et al. | |
| 7,159,731 B2 | 1/2007 | Kai | |
| 7,641,175 B1 | 1/2010 | Blume | |
| 7,721,753 B2 | 5/2010 | Wears | |
| 2006/0202150 A1 | 9/2006 | Johnson | |
| 2007/0246673 A1 | 10/2007 | Bircann | |
| 2011/0180163 A1 | 7/2011 | Jakubowski | |
| 2012/0074687 A1 * | 3/2012 | Mitchell | 285/179 |

* cited by examiner

MULTI-PART VALVE ASSEMBLY

TECHNICAL FIELD OF INVENTION

The present invention relates to a valve assembly for use in reciprocating, positive displacement pumps, such as mud pumps, well service pumps, and other industrial applications. More particularly, the present invention is especially suitable for use in a fracking pump for subterranean production services. More specifically, the present invention relates to a multi-part valve assembly of various materials constructed in a novel manner that replaces conventional two and three part welded valves.

BACKGROUND OF THE INVENTION

Valves have been the subject of engineering design efforts for many years, and millions of them have been used. The engineering development of valves has stagnated in this crowded and mature field of technology. Improvements have been elusive in recent years, even as the cost of materials and manufacturing has continued to climb.

The basic valve structure is present in several U.S. patent publications. Some of these describe conventional methods of building a valve, and others describe methods that have been rejected by industry. Fewer disclosures teach multiple component valves, as valves having multiple components have heretofore been disfavored for a number of reasons. Primarily, they are viewed as more costly to manufacture. Multiple components require multiple manufacturing steps, assembly steps, and fit-tolerances requirements that valves having fewer parts do not have. Secondly, each assembly and connection is deemed a potential failure point, so these valves are again, disfavored.

Fracking valves are a particular valve used to pump hard material into a production wellbore for the purpose of fracturing the reservoir containing formations to increase fluid flow into the wellbore. Such pumps are reciprocating, positive displacement pumps in which the valves are held closed by springs and open and close by differential pressure. The pumps deliver clear fluids or slurries through simple poppet valves that are activated (opened and closed) by the fluid pressure differential generated when the mechanical energy of the pump is converted into fluid pressure.

In oil and gas exploration, there are two common reciprocating, positive displacement applications; mud pumps and well service pumps. This invention is also appropriate in both of these categories as well as other, general industrial reciprocating, positive displacement applications. Pump valves in these applications must be guided as they move back and forth about an axis parallel to the fluid flow. The guides may be "stems" or "wings" and these may be on either side or both sides of the valve. They must remain an inseparable part of the pump valve during its useful life.

Due to the hardness of the material being pumped, valves include a soft seating material, such as a urethane insert, such that a seal can be obtained that would be prevented with a metal-to-metal valve seating. The softer insert component necessitates at least some assembly in frack valves. Other than the inclusion of the insert, conventional manufacturing practice has been to minimize the number of components in a valve assembly.

Conventional pump valves are thus made from a pair of near net shape pieces of low carbon alloy steel that are welded together and then carburized to produce a hard, wear resistant surface. The process of manufacturing such near net shapes is expensive. Alternatively, pump valves are made from high carbon, low alloy steels of one expensive piece that requires detailed finishing, as these alloys are generally not welded.

One form of convention valve manufacturing includes making the components of the valve of high alloy steel such as 8620 or 4130. These are expensive grades of steel for manufacturing a limited life product. Additionally, conventional manufacturing techniques generate waste.

Conventional valve guides are manufactured by investment casting. It is common practice to forge a one-piece valve and top stem of low carbon alloy steel. The two pieces are welded together and carburized as a single piece.

An alternative known method of making valves is to make a single investment casting of the entire valve for assembly with only the insert. As with the other method, the entire part is then carburized to harden it.

An alternative known method of making valves is to make a single piece forging from a high carbon alloy steel. Areas that require hardened surfaces are induction or flame hardened. However, the only areas of the valve that require hardened surfaces are relatively small and include the face of the valve and the outer edges of the guides.

The present invention replaces expensive raw material forms with a combination of inexpensive pieces and allows the most productive selective hardening processes to be used.

SUMMARY OF THE INVENTION

The present invention provides a method of manufacturing and assembling a pump valve that allows the use of materials usually considered unsuitable for multiple components welded together to be constructed as a weldment.

This present invention provides for the use of high carbon or high carbon alloy steel that can be induction or flame hardened and a collection of inexpensive pieces to be assembled and captured as a finished unit at the time of welding. The weld can be a solid state inertia or friction weld or any appropriate melt fusion technique. The assembly includes a retaining pin, a guide, a valve, an insert, a retainer, and a retainer cap. The retainer cap is welded to an end of the retaining pin to compress the other elements into an assembly.

One embodiment of the present invention provides for the assembly of several components of simpler geometry that would not generally be considered candidates for welding because of their composition.

In another embodiment, a valve assembly is provided comprising a retaining pin, a wing guide located on the retaining pin, and a valve located on the retaining pin above the guide. An insert is located on the valve. An insert retainer is located on the retaining pin above the insert. A retainer cap is welded to the retaining pin to hold the collective assembly together.

In another embodiment, the retaining pin, guide, insert retainer, and retainer cap are comprised of a low carbon, or low alloy steel material, and the valve is comprised of a steel that is higher in carbon content than that of the retaining pin, guide, insert retainer, and retainer cap.

In another embodiment, the weld between the retainer cap and the retaining pin is an inertia weld.

In another embodiment, the retainer cap has a nonagon configuration.

In another embodiment, the guide has a central portion and three legs extending downward from the central portion. A footer extends outward from each leg. Three stabilizers extend downward from the central portion, one each between the downwardly extending legs.

In another embodiment, a plurality of tabs extends outward from the central portion. The tabs engage the internal circumference of a circular recess in the valve to center the guide concentrically with the valve.

In another embodiment, the retaining pin has a generally triangular head for fitted engagement with the underside of the guide.

A primary advantage of the present invention is that many of the parts may be made of material that is easy to machine, such that these components can be made less expensively.

Another advantage of the present invention is that many of the components need not be heat treated, eliminating a costly process step that is applied to the entirety of conventional valve assemblies.

Another advantage of the present invention is that it is unnecessary to selectively and manually apply and remove expensive compounds needed to prevent carburization of several surfaces to which hardening is undesirable.

The advantages and features of the invention will become more readily understood from the following detailed description and appended claims when read in conjunction with the accompanying drawings in which like numerals represent like elements.

The drawings constitute a part of this specification and include exemplary embodiments to the invention, which may be embodied in various forms. It is to be understood that in some instances various aspects of the invention may be shown exaggerated or enlarged to facilitate an understanding of the invention.

DETAILED DESCRIPTION OF THE PREFERRED EMBODIMENTS

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Figure 1:
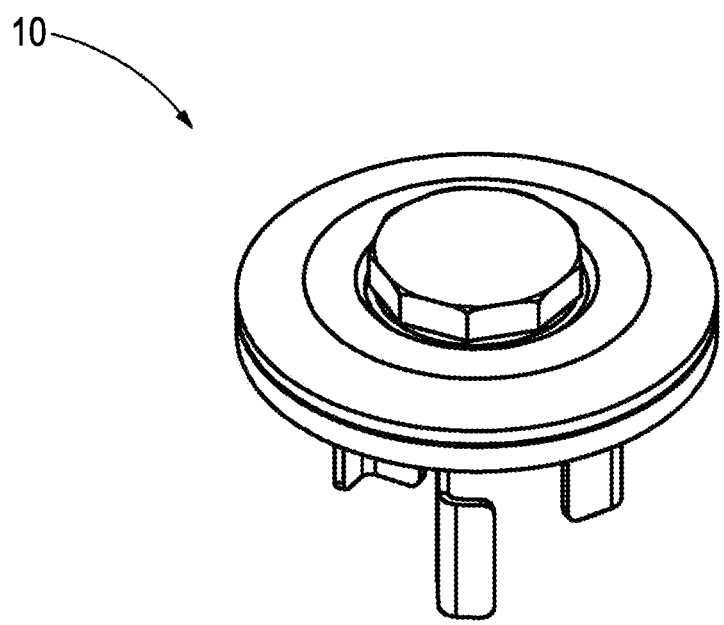
FIG. 1 is an isometric view of the valve assembly shown in accordance with certain embodiments of the present invention, as viewed from the top of the valve.
Figure 2:
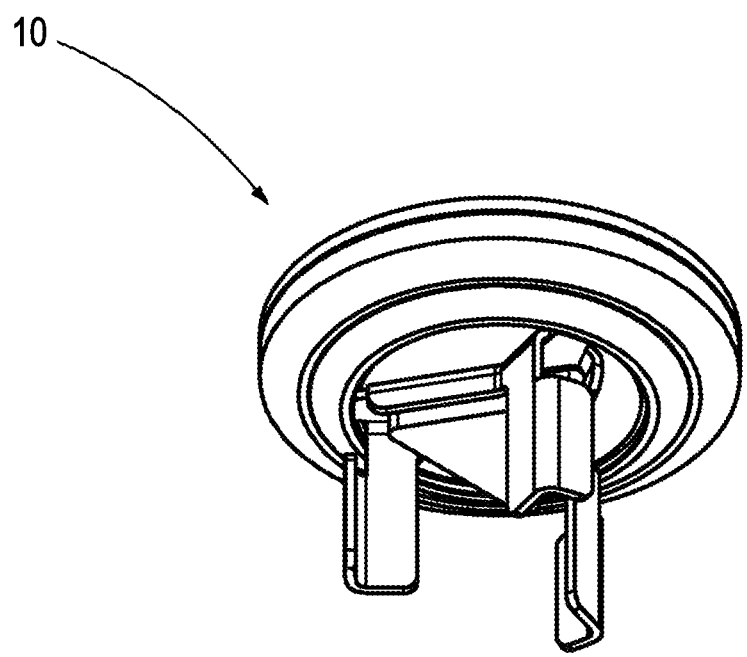
FIG. 2 is an isometric view of the valve assembly of FIG. 1 as viewed from the bottom of the valve.

FIG. 1 is an isometric view of an embodiment of a valve assembly 10 of the present invention as viewed generally from the top of valve assembly 10. FIG. 2 is an isometric view of this embodiment of valve assembly 10 as viewed generally from the bottom of valve assembly 10.

Figure 3:
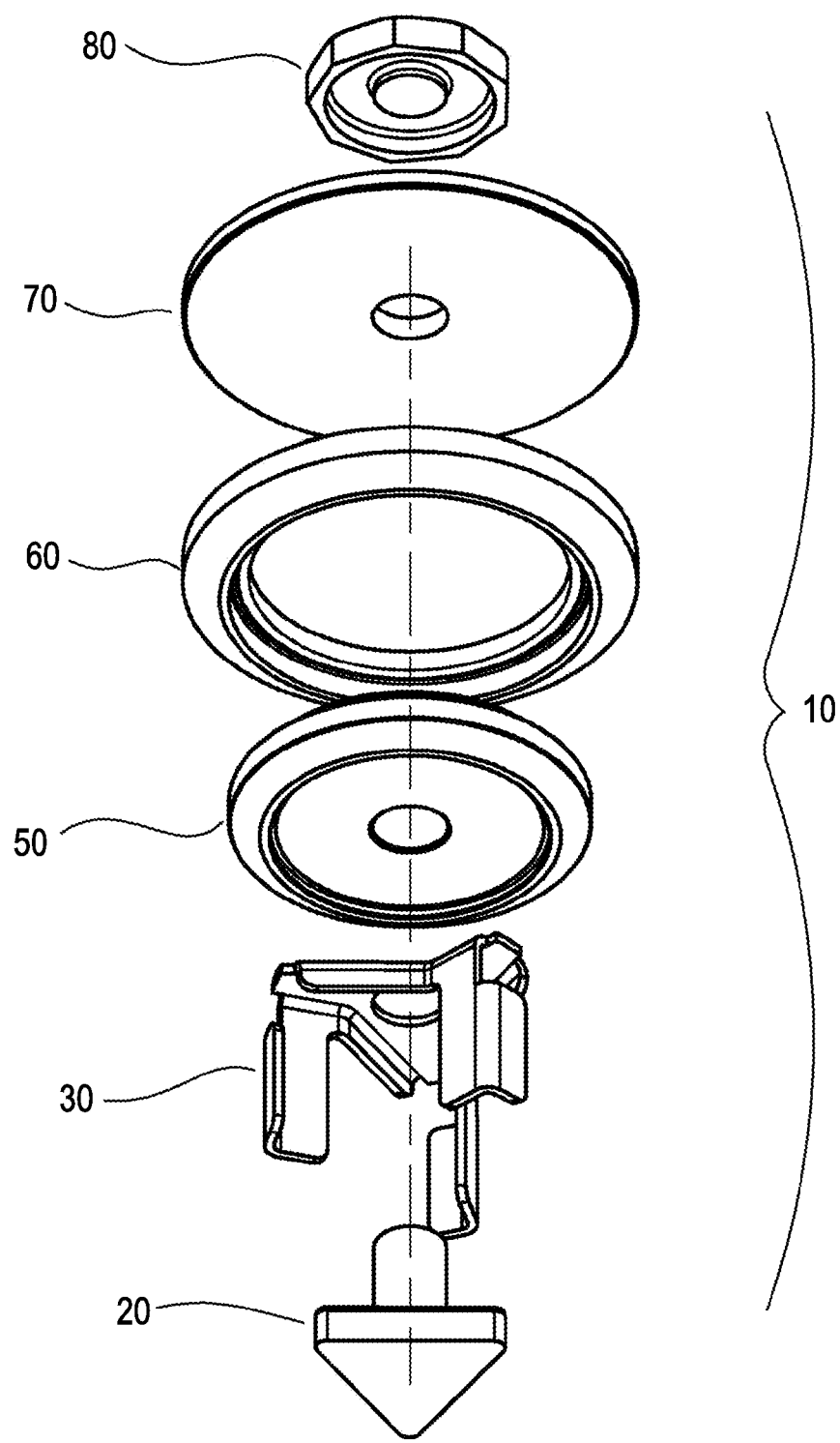
FIG. 3 is an isometric exploded view of the valve assembly of FIGS. 1-2 shown in accordance with certain embodiments of the present invention.

FIG. 3 is an isometric exploded view of an embodiment of valve assembly 10, illustrating the multiple components of this embodiment. Valve assembly 10 comprises a retaining pin 20. A guide 30 is positioned on retaining pin 20. A valve 50 is positioned on retaining pin 20 above guide 30. An insert 60 is positioned on and in engagement with valve 50. A retainer 70 is positioned on retaining pin 20 above and engaging insert 60 and valve 50. A retainer cap 80 is welded to retaining pin 20 and optionally to retainer 70.

Figure 4:
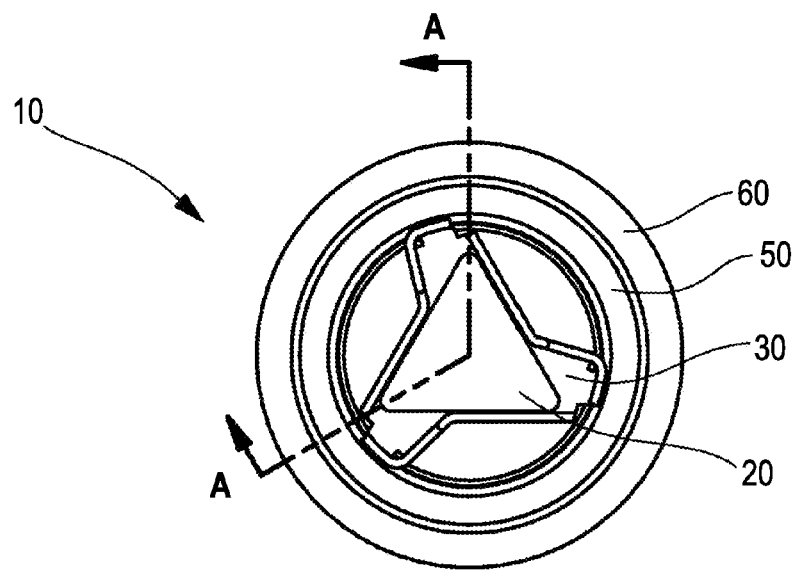
FIG. 4 is a bottom view of the valve assembly embodiment of FIGS. 1-3, illustrating a section line A-A through this view of the valve assembly.

FIG. 4 is a bottom view of the embodiment of valve assembly 10 illustrated in FIGS. 1-3, and providing a section line A-A through this view of valve assembly 10.

Figure 5:
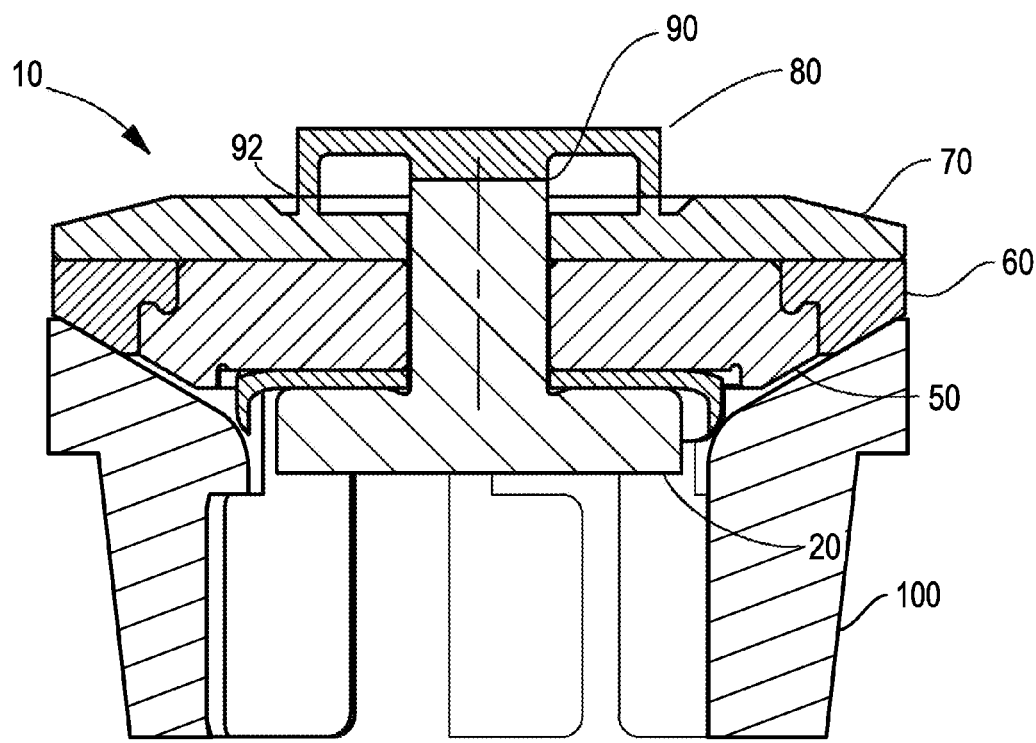
FIG. 5 is a sectional view of the valve assembly embodiment of FIGS. 1-4 sectioned at A-A as illustrated in FIG. 4.

FIG. 5 is a sectional view of the valve assembly embodiment of FIGS. 1-4 sectioned at A-A as illustrated in FIG. 4. Valve assembly 10 is illustrated inside a cylinder 100. As shown, guide 30 centers valve assembly 10 inside cylinder 100. Valve 50 engages cylinder 100 in normal operation, as does insert 60. Retainer 70 compresses insert 60, valve 50, and guide 30 between retaining pin 20 and retainer cap 80. Retainer cap 80 is welded at 90 to retaining pin 20 to form a secure valve assembly 10 in which the component parts do not rotate relative to each other. In an optional embodiment illustrated, retainer cap 80 is also welded at 92 to retainer 70. In a preferred embodiment, retainer cap 80 is friction, or inertia welded at 90 to retaining pin 20 and/or friction or inertia welded at 92 to retainer 70.

Figure 6:
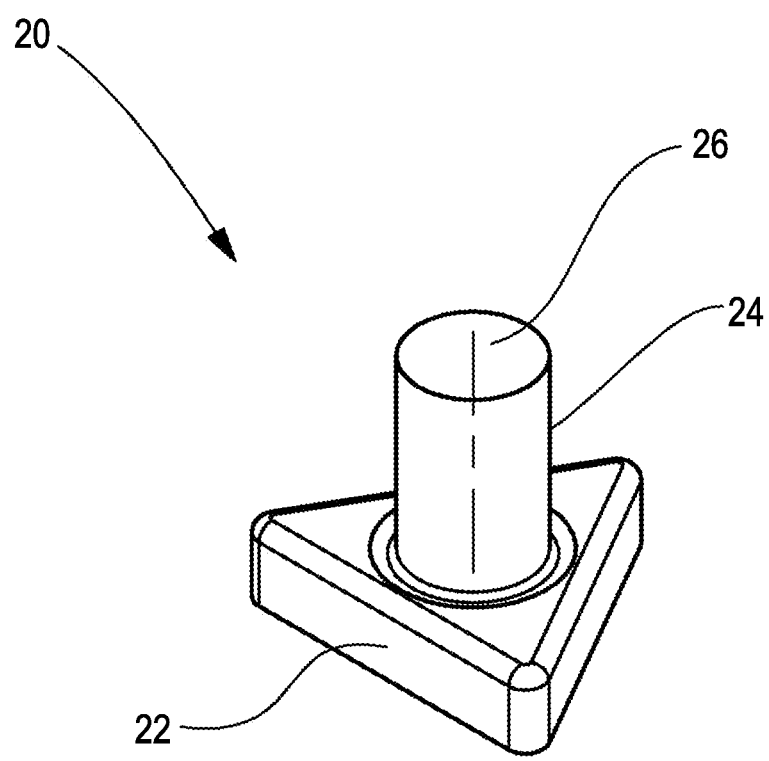
FIG. 6 is an isometric view of the retaining pin component of the valve assembly embodiment illustrated in FIGS. 1-3.

FIG. 6 is an isometric view of an embodiment of the retaining pin 20 component of the illustrated embodiment of valve assembly 10. In the embodiment illustrated, retaining pin 20 has a triangular shaped base 22. Referring back to FIG. 4, it is seen that a substantially triangular head 22 of retaining pin 20 provides an increased contact surface area to better secure the generally triangular configuration of guide 30 into valve assembly 10.

A pin shaft 24 extends upwards from the center of base 22. An end face 26 is formed on the end of pin shaft 24 opposite to base 22. In the disclosed assembly, retaining pin 20 may be made of low carbon steel, such as 1018 or other suitable material. In this embodiment, heat treatment of retaining pin 20 is advantageously not required.

Figure 7:
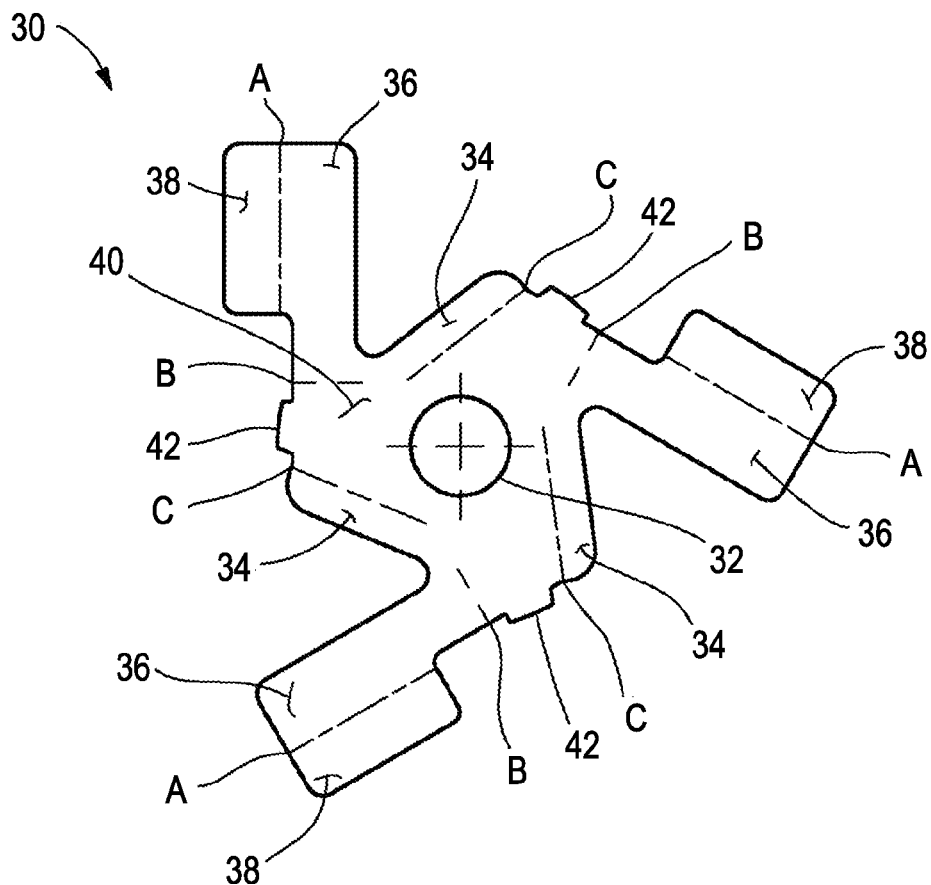
FIG. 7 is a bottom view of an in-process guide component of the valve assembly embodiment illustrated in FIGS. 1-3.

FIG. 7 is a bottom view of an embodiment of guide 30 of valve assembly 10, shown in process. Among the several unique features of the present invention is the inclusion of a flat stock guide component 30, shown here after stamping and prior to forming. Optionally, guide 30 may be formed by laser cutting. Guide 30 has an aperture 32 for positioning guide 30 over retaining pin 20. At this stage, guide 30 has a substantially flat central portion 40.

Referring to FIG. 7, dashed lines A, B and C, illustrate nine separate folds of the flat stock of guide 30 that are required to create the final part illustrated in this embodiment. Folds 'A' create three footers 38. Folds 'B' create three legs 36, which include footers 38. Folds 'C' create three stabilizers 34. Of these components, only footers 38 may come into contact with cylinder 100 (FIG. 4). Footers 38 may have hardfacing or other treatment applied to enhance their wear resistance without the need to heat treat the entire valve assembly.

Figure 8:
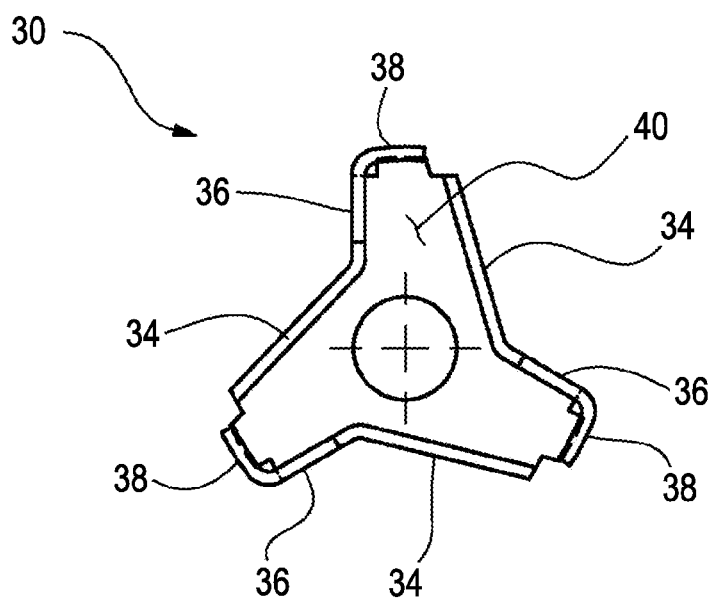
FIG. 8 is a bottom view of the guide component of FIG. 7 after a forming step.
Figure 9:
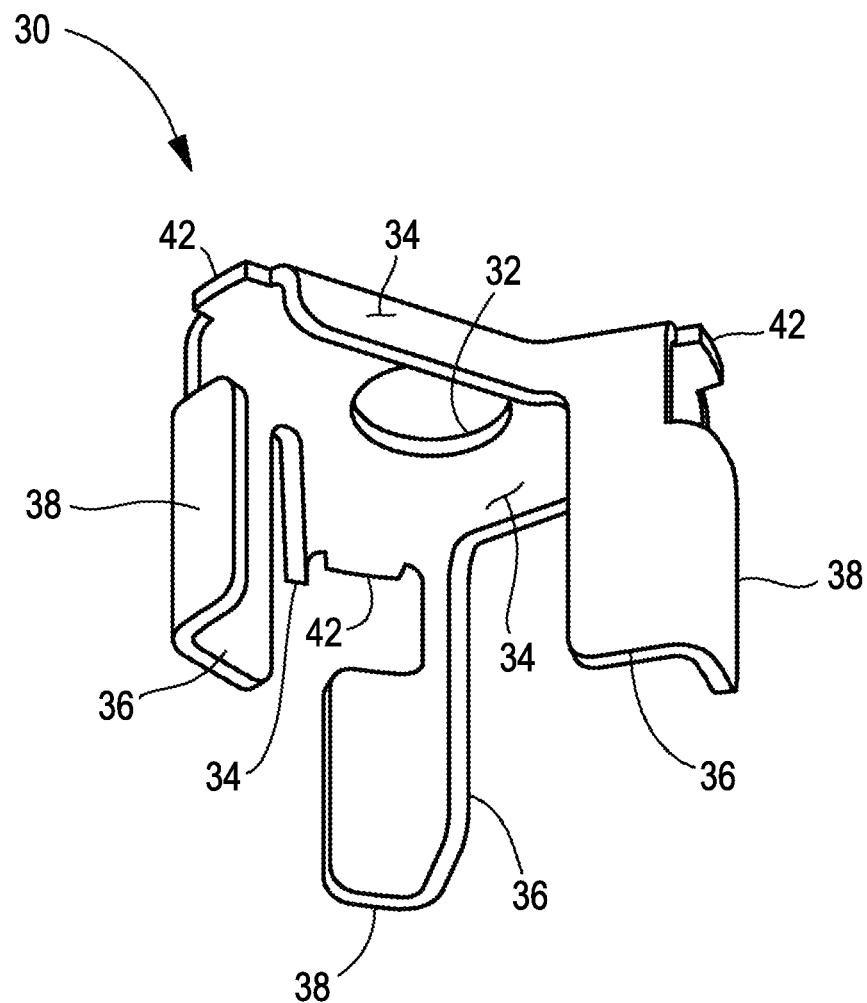
FIG. 9 is an isometric view of the guide component of FIG. 8.

FIG. 8 is a bottom view of guide 30 of FIG. 7 after a forming step which includes the bending of folds A, B and C. FIG. 9 is an isometric view of the embodiment of guide 30 illustrated in FIG. 8. As best seen in FIG. 9, folds A have created footers 38 which extend substantially perpendicular, one each, in relation to legs 36. Folds B have created legs 36 which extend downward and substantially perpendicular in relation to top surface 34. Folds C have created stabilizers 34, which also extend downward and substantially perpendicular in relation to top surface 40.

In a preferred embodiment illustrated in FIGS. 8 and 9, the folds at B and C can be advantageously formed such that contiguous stabilizers 34 and legs 36 provide a singular substantially continuous structure. In this manner, stabilizers 34 and legs 36 provide mutual support and strengthen the structure of guide 30.

As best seen in FIGS. 7 and 9, a plurality of tabs 42 is provided that extends outward from central portion 40. Tabs 42 may be used to provide locating structures for accurate bending of folds A, B, and C. Referring back to FIG. 4, tabs 42 further provide triangulated positioning of guide 30 inside a recess 57 (see FIG. 10) of valve 50 of valve assembly 10. In this manner, a more accurate concentric alignment of the guide 30 and footers 38 can be achieved with regard to the center of valve 50. It is understood that such concentricity between these structures is critical to the life and performance of valve assembly 10. It is further understood that direct three-point alignment between valve 50 and guide 30 is superior to the inevitable accumulated tolerances realized in aligning all components on a third body, such as retaining pin 20.

As described, the unique configuration and process for manufacturing guide 30 may be advantageously made of an inexpensive low carbon, or low carbon alloy sheet steel, or other affordable material. Guide 30 may also be made of high carbon steel. It may only be necessary to heat treat or otherwise surface treat legs 36 of guide 30. Legs 36 and/or guide 30 may be readily heat treated by various means, including, but not limited to, induction or laser heat treating, spot welding, or conventional hardfacing.

Figure 10:
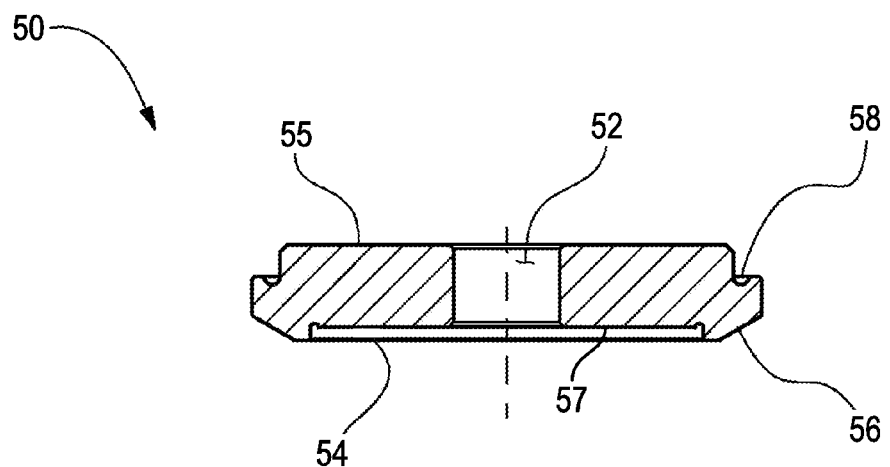
FIG. 10 is a cross-sectional side view of the valve component of the valve assembly embodiment illustrated in FIGS. 1-3.

FIG. 10 is a cross-sectional side view of an embodiment of valve 50 of valve assembly 10. In this embodiment, valve 50 has an aperture 52 for location of valve 50 onto retaining pin 20. Valve 50 has a recess 57 on bottom surface 54 and an opposite top surface 55 connected at their centers by aperture 52. Valve 50 has a valve face 56. A tongue and groove 58 is provided between valve face 56 and top surface 55. Recess 57 of bottom surface 54 engages central portion 40 of guide 30 when assembled on retaining pin 20. Tabs 42 of guide 30 position guide 30 centrally by engaging the inner circumference of recessed surface 54.

Valve face 56 is commonly angled between 30 and 45 degrees relative to recessed bottom surface 54. Valve 50 may be made of suitable steel such as 4150 or other relatively hard steel. In one embodiment, valve 50 may be hardened by induction hardening or other appropriate heat treating method. Advantageously, valve 50 may be heat treated without the requirement to heat treat the entire valve assembly 10.

Figure 11:
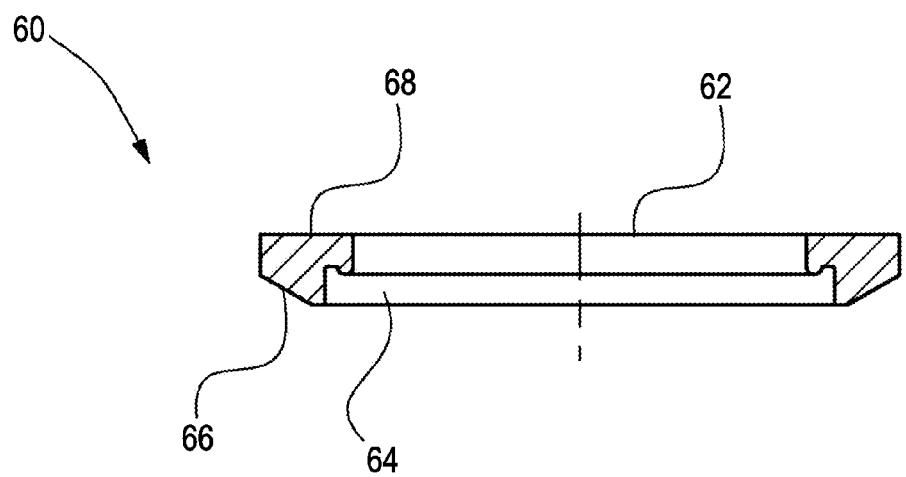
FIG. 11 is a cross-sectional side view of the insert component of the valve assembly embodiment illustrated in FIGS. 1-3.

FIG. 11 is a cross-sectional side view of an embodiment of insert 60 of valve assembly 10. Insert 60 has an aperture 62. Insert 60 has a top surface 68 and a face 66. A tongue and groove 64 is provided between aperture 62 and face 66. Tongue and groove 64 is configured for complementary engagement with tongue and groove 58 of valve 50. Aperture 62 fits over valve 50 to engage insert 60 with valve 50.

Insert face 66 is commonly angled between 30 and 45 degrees relative to insert top surface 68, such that when insert 60 is located onto valve 50, insert face 66 and valve face 56 form a semi-continuous surface for engaging cylinder 100, as best seen in FIG. 5.

Insert 60 may be made of urethane or other suitable material that is used to manufacture inserts for conventional valve designs. Insert 60 operates to provide a seal with cylinder 100 when debris common to operations such as fracking prevents a metal-to-metal seal. In a preferred embodiment, insert 60 is compressively fit over valve 50, thereby enhancing the wear performance of the elastomeric insert 60.

Figure 12:
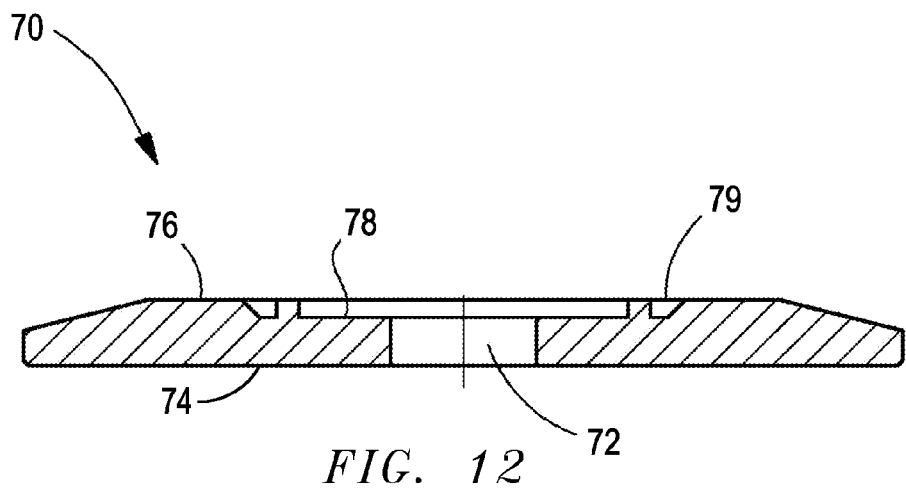
FIG. 12 is a cross-sectional side view of the retainer component of the valve assembly embodiment illustrated in FIGS. 1-3.

FIG. 12 is a cross-sectional side view of an embodiment of retainer 70 of valve assembly 10. Retainer 70 has an aperture 72 for location onto retaining pin 20. Retainer 70 has a bottom surface 74 and a top surface 76. Bottom surface 74 engages top surface 62 of insert 60 when assembled on retaining pin 20. Retainer 70 may be advantageously made of low carbon steel such as 1020 steel or other suitable material. In the embodiment illustrated, heat treatment is optional, and not required.

In the embodiment illustrated, a first circular recess 78 is located in top surface 76. In an optional embodiment, a second circular recess 79 is located on top surface 76.

Figure 13:
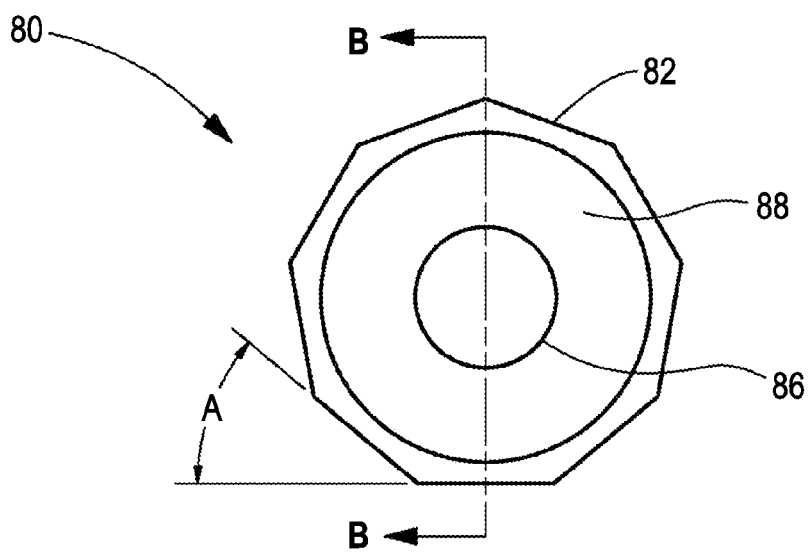
FIG. 13 is a bottom view of the retainer cap of the valve assembly embodiment illustrated in FIGS. 1-3.
Figure 14:
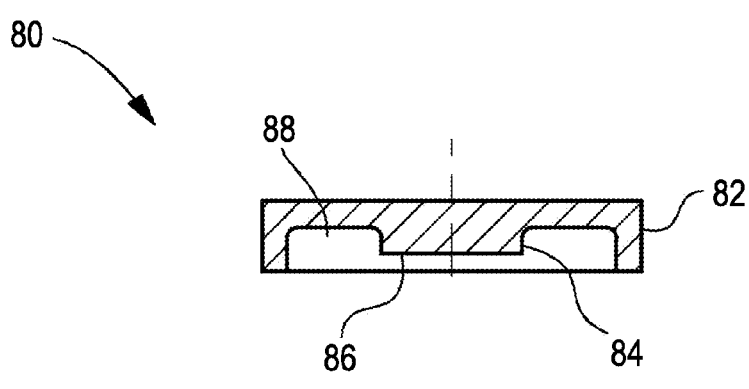
FIG. 14 is a sectional view of the retainer cap of the valve assembly embodiment illustrated in FIGS. 1-3 sectioned at B-B as illustrated in FIG. 13.

FIG. 13 is a bottom view of an embodiment of retainer cap 80 of the valve assembly 10 embodiment illustrated in FIGS. 1-3. FIG. 14 is a sectional view of the embodiment of retainer cap 80 sectioned at B-B as illustrated in FIG. 13. Referring to FIGS. 13 and 14, retainer cap 80 has a head portion 82 on top of a stem portion 84. A substantially flat base 86 is located at the end of stem 84. A flash trap 88 is formed on the underside of head portion 82, adjacent stem 84, to facilitate welding.

In the embodiment illustrated, as best seen in FIG. 13, the exterior of head portion 82 is configured to have nine symmetrical sides. The nonagon exterior perimeter generates contiguous sides having an angle 'A' of about 40 degrees between them. Other shapes may be used. Retainer cap 80 may be made of a low alloy, or low carbon steel. Heat treatment of retainer cap 80 is optional, and is not required.

In the assembly of valve assembly 10, guide 30, valve 50, insert 60, and retainer 70 are stacked on stem 24 of retaining pin 20. Force is applied between head 22 and retainer cap 80 to compress the assembly. Base 86 of retainer cap 80 is welded to end face 26 of retaining pin 20. This weld can be a solid state inertia or friction weld or any appropriate meld fusion technique. In another embodiment illustrated, cap 80 may optionally be welded directly to retainer 70 on top surface 76 between first recess 78 and second recess 79.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered desirable by those skilled in the art based upon a review of the foregoing description of preferred embodiments. Accordingly, it is appropriate that the appended claims be construed broadly and in a manner consistent with the scope of the invention.

The invention claimed is:

1. A valve assembly, comprising:
a retaining pin;
a guide located on the retaining pin;
the guide having a central portion;
a valve located on the retaining pin on top of the guide;
a recess formed on a bottom side of the valve;
the central portion of the guide located inside the recess to position the guide concentrically with the valve;
an insert located on the valve;
an insert retainer located on the retaining pin above the insert;
a retainer cap is located above the insert retainer and affixed to the retaining pin; and,
three legs extending downward from the central portion.

2. The valve assembly of claim 1, the guide further comprising:
a footer extending outward from each leg; and,
three stabilizers extending downward from the top portion.

3. The valve assembly of claim 2, further comprising:
the guide legs bent-formed from the central portion;
the guide footers bent-formed from the guide legs; and,
the stabilizers bent-formed from the central portion.

4. The valve assembly of claim 2, further comprising:
the guide stabilizers and the guide legs forming a substantially continuous structure.

5. The valve assembly of claim 2, further comprising:
the retaining pin engaging at least two stabilizers of the guide.

6. The valve assembly of claim 1, further comprising:
the retaining pin, guide, insert retainer, and retainer cap, being comprised of steel; and,
the valve being comprised of a steel that is higher in carbon content than that of the retaining pin, guide, insert retainer, and retainer cap.

7. The valve assembly of claim 1, further comprising:
an inertia weldment affixing the retainer cap to the retaining pin.

8. The valve assembly of claim 1, further comprising:
the retainer cap having a nonagon configuration.

9. The valve assembly of claim 1, further comprising:
the retaining pin having a generally triangular head.

10. A valve assembly, comprising:
a retaining pin;
a guide located on the retaining pin;
the guide having a central portion;
a valve located on the retaining pin on top of the guide;
a recess formed on a bottom side of the valve;
an insert located on the valve;
an insert retainer located on the retaining pin above the insert;
a retainer cap affixed to the retaining pin;
the central portion of the guide having externally extending tabs; and,
the tabs located inside the internal circumference of the valve recess to position the guide concentrically with the valve.

* * * * *